United States Patent
Faruque et al.

(10) Patent No.: US 11,648,907 B1
(45) Date of Patent: May 16, 2023

(54) DOOR-MOUNTED VEHICLE AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/746,193

(22) Filed: May 17, 2022

(51) Int. Cl.
*B60R 21/21* (2011.01)
*B60R 21/264* (2006.01)
*B60R 21/231* (2011.01)

(52) U.S. Cl.
CPC ........ *B60R 21/21* (2013.01); *B60R 21/23138* (2013.01); *B60R 21/264* (2013.01); *B60R 2021/23107* (2013.01)

(58) Field of Classification Search
CPC . B60R 21/21; B60R 21/23138; B60R 21/264; B60R 2021/23107
See application file for complete search history.

(56) References Cited

U.S. PATENT DOCUMENTS

| | | | |
|---|---|---|---|
| 5,273,309 A * | 12/1993 | Lau | B60R 21/23138 280/730.2 |
| 5,647,609 A | 7/1997 | Spencer et al. | |
| 5,752,713 A * | 5/1998 | Matsuura | B60R 21/23138 280/730.2 |
| 5,957,493 A * | 9/1999 | Larsen | B60R 21/2346 280/730.2 |
| 5,975,566 A * | 11/1999 | Bocker | B60R 21/2338 280/730.2 |
| 6,688,641 B2 * | 2/2004 | Dominissini | B60R 21/232 280/730.2 |
| 6,824,164 B2 * | 11/2004 | Pywell | B60R 21/08 280/730.2 |
| 7,004,498 B2 * | 2/2006 | Daines | B60R 21/2338 280/730.2 |
| 7,552,940 B2 | 6/2009 | Lindemann et al. | |
| 8,360,465 B1 | 1/2013 | Nelson et al. | |
| 8,851,510 B1 * | 10/2014 | Dinsdale | B60R 21/23138 280/730.2 |
| 10,525,925 B2 * | 1/2020 | Deng | B60R 21/2165 |

\* cited by examiner

*Primary Examiner* — Faye M Fleming
(74) *Attorney, Agent, or Firm* — Frank A. MacKenzie; Bejin Bieneman PLC

(57) ABSTRACT

An assembly for a vehicle includes a vehicle pillar. The assembly includes a vehicle door adjacent the vehicle pillar. The assembly includes an airbag supported by the vehicle door. The airbag includes an upper portion inflatable upwardly and a lower portion inflatable downwardly. The assembly includes a pyrotechnic device supported by the vehicle pillar. The assembly includes a cable extending along the vehicle pillar from the pyrotechnic device and coupling the upper portion of the airbag to the pyrotechnic device.

20 Claims, 9 Drawing Sheets

DOOR-MOUNTED VEHICLE AIRBAG

BACKGROUND

An airbag is mounted to a door and is inflatable along a side of an occupant, specifically along the torso, hip and/or head of the occupant. The airbag, for example, may be inflatable between the occupant and a vehicle door. The airbag controls the kinematics of the occupant in vehicle impacts that urge the occupant in a cross-vehicle direction, e.g., a certain side impacts.

DETAILED DESCRIPTION

Figure 1:
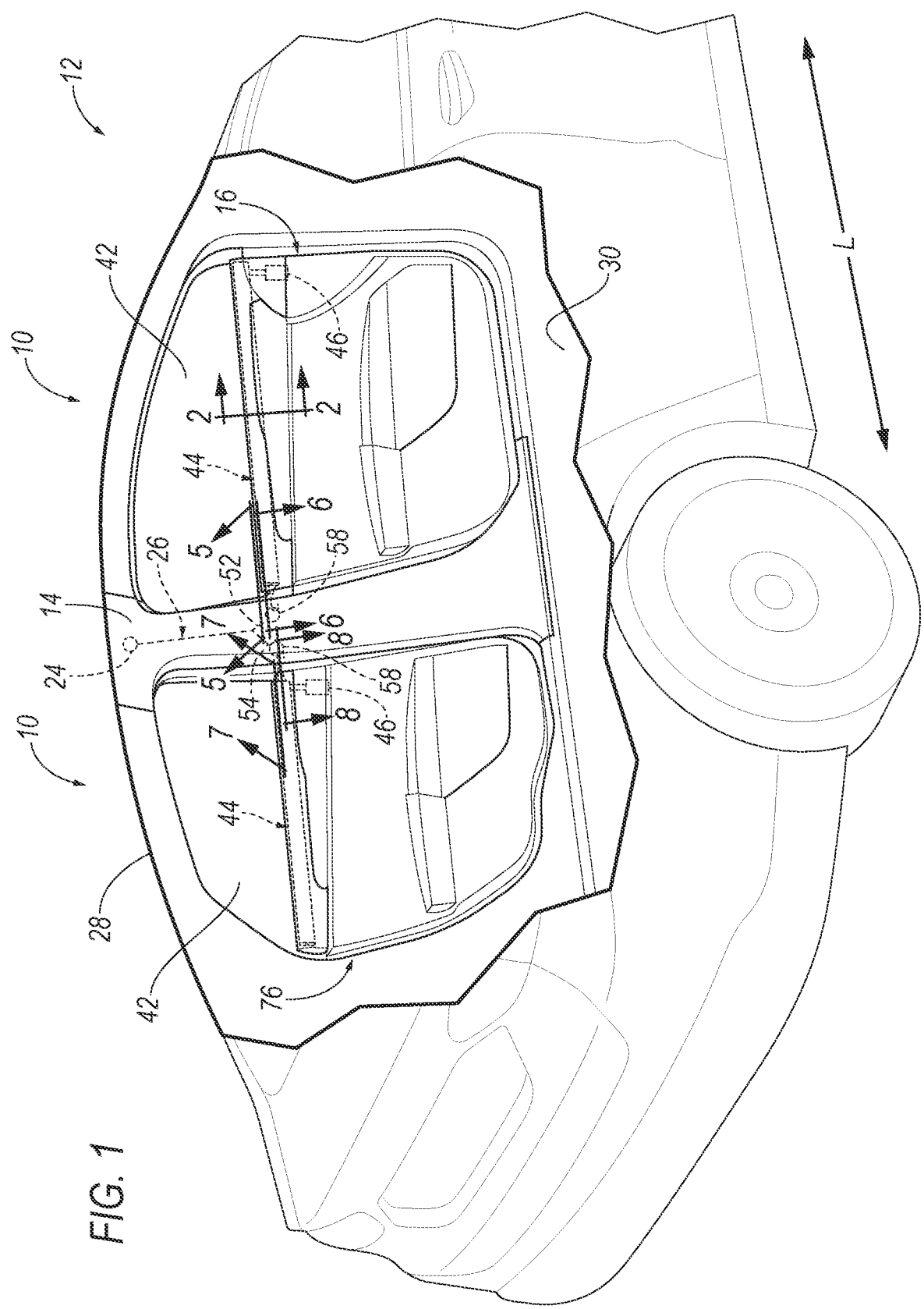
FIG. 1 is a side cutaway view of a vehicle having a plurality of doors and airbags supported by the doors.

An assembly includes a vehicle pillar. The assembly includes a vehicle door adjacent the vehicle pillar. The assembly includes an airbag supported by the vehicle door. The airbag includes an upper portion inflatable upwardly and a lower portion inflatable downwardly. The assembly includes a pyrotechnic device supported by the vehicle pillar. The assembly includes a cable extending along the vehicle pillar from the pyrotechnic device and coupling the upper portion of the airbag to the pyrotechnic device.

The upper portion of the airbag may include an upper end, the cable coupling the upper end of the upper portion of the airbag to the pyrotechnic device.

The assembly may include a hook connected to one of the upper portion of the airbag and the cable and a ring connected to the other of the upper portion of the airbag and the cable, the hook and the ring being engaged when the airbag inflates to an inflated position.

The assembly may include a solenoid coupled to the hook, the hook being moveable by the solenoid along a vehicle-longitudinal axis.

The vehicle door may move relative to the vehicle pillar between an open position and a closed position, and may include a hook connected to one of the upper portion of the airbag and the cable and a ring connected to the other of the upper portion of the airbag and the cable, and the hook being in the ring when the vehicle door is in the closed position.

The hook may be out of the ring when the vehicle door is in the open position.

The cable may be movable upwardly along the vehicle pillar by the pyrotechnic device as the airbag inflates to an inflated position.

The upper portion of the airbag may include an upper end and the lower portion of the airbag includes a lower end, the upper end being spaced from the lower end.

The airbag may be vehicle-inboard of the vehicle door when the airbag is in an inflated position.

The assembly may include a vehicle seat adjacent the vehicle door, the airbag being inflatable between the vehicle seat and the vehicle door.

The vehicle seat may define an occupant seating area, the airbag being inflatable between the vehicle door and the occupant seating area.

The assembly may include a door-trim panel supported by the vehicle door and a window supported by the vehicle door, the upper portion is inflatable adjacent the window and the lower portion of the airbag is inflatable adjacent the door-trim panel.

The airbag may be between the door-trim panel and the vehicle door when the airbag is in an uninflated position.

The upper portion of the airbag and the lower portion of the airbag may be doubly rolled in an uninflated position.

The pyrotechnic device may be a rotary pyrotechnic device.

The assembly may include a second vehicle door spaced from the vehicle door along a vehicle-longitudinal axis, the vehicle pillar being between the vehicle door and the second vehicle door, a second airbag supported by the second vehicle door, and the second airbag including an upper portion inflatable upwardly and a lower portion inflatable downwardly.

The cable may extend along the vehicle pillar from the pyrotechnic device and coupling the upper portion of the second airbag to the pyrotechnic device.

The assembly may include a first hook connected to one of the upper portion of the airbag and the cable and a first ring connected to the other of the upper portion of the airbag and the cable, the first hook and the first ring engaging when the airbag inflates to an inflated position, and a second hook connected to one of the upper portion of the second airbag and the cable and a second ring connected to the other of the upper portion of the second airbag and the cable, the second hook and the second ring engaging when the second airbag inflates to an inflated position.

The first ring and the second ring may be movable upwardly along the vehicle pillar by the pyrotechnic device as the airbags inflate to the inflated positions.

The vehicle pillar may be between the airbag and the second airbag.

With reference to the Figures, wherein like numerals indicate like parts throughout the several views, an assembly 10 for a vehicle 12 includes a vehicle pillar 14. The assembly 10 includes a vehicle door 16, 76 adjacent the vehicle pillar 14. The assembly 10 includes an airbag 18 supported by the vehicle door 16, 76. The airbag 18 includes an upper portion 20 inflatable upwardly and a lower portion 22 inflatable downwardly. The assembly 10 includes a pyrotechnic device 24 supported by the vehicle pillar 14. The assembly 10 includes a cable 26 extending along the vehicle pillar 14 from the pyrotechnic device 24 and coupling the upper portion 20 of the airbag 18 to the pyrotechnic device 24.

In the event of an impact to the vehicle 12, the airbag 18 may inflate to an inflated position adjacent an occupant of the vehicle 12 to control the kinematics of the occupant. The upper portion 20 is inflatable upwardly and the lower portion 22 is inflated downwardly from the vehicle door 16, 76 and adjacent an occupant of the vehicle 12. The pyrotechnic device 24 pulls the cable 26 upwardly along the vehicle pillar to move the upper portion 20 upwardly to limit the downward movement of the upper portion 20.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 may include a vehicle body (not numbered). The vehicle body includes body panels (not numbered) partially defining an exterior of the vehicle 12. The body panels may present a class-A surface, e.g., a finished surface exposed to view by a customer and free of unaesthetic blemishes and defects. The body panels include, e.g., a roof 28, a floor 30, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body may include pillars 14. The vehicle body may include any suitable number of pillars 14. For example, the vehicle body may include an A-pillar and a B-pillar on each side of the vehicle 12. The A-pillars may be disposed at the front end of the passenger compartment. The B-pillars may be spaced from the A-pillars by a front door opening. The vehicle 12 may include additional pillars, e.g., C-pillars, D-pillars. The pillars 14 may extend from the roof 28 to the floor 30.

Figure 4:
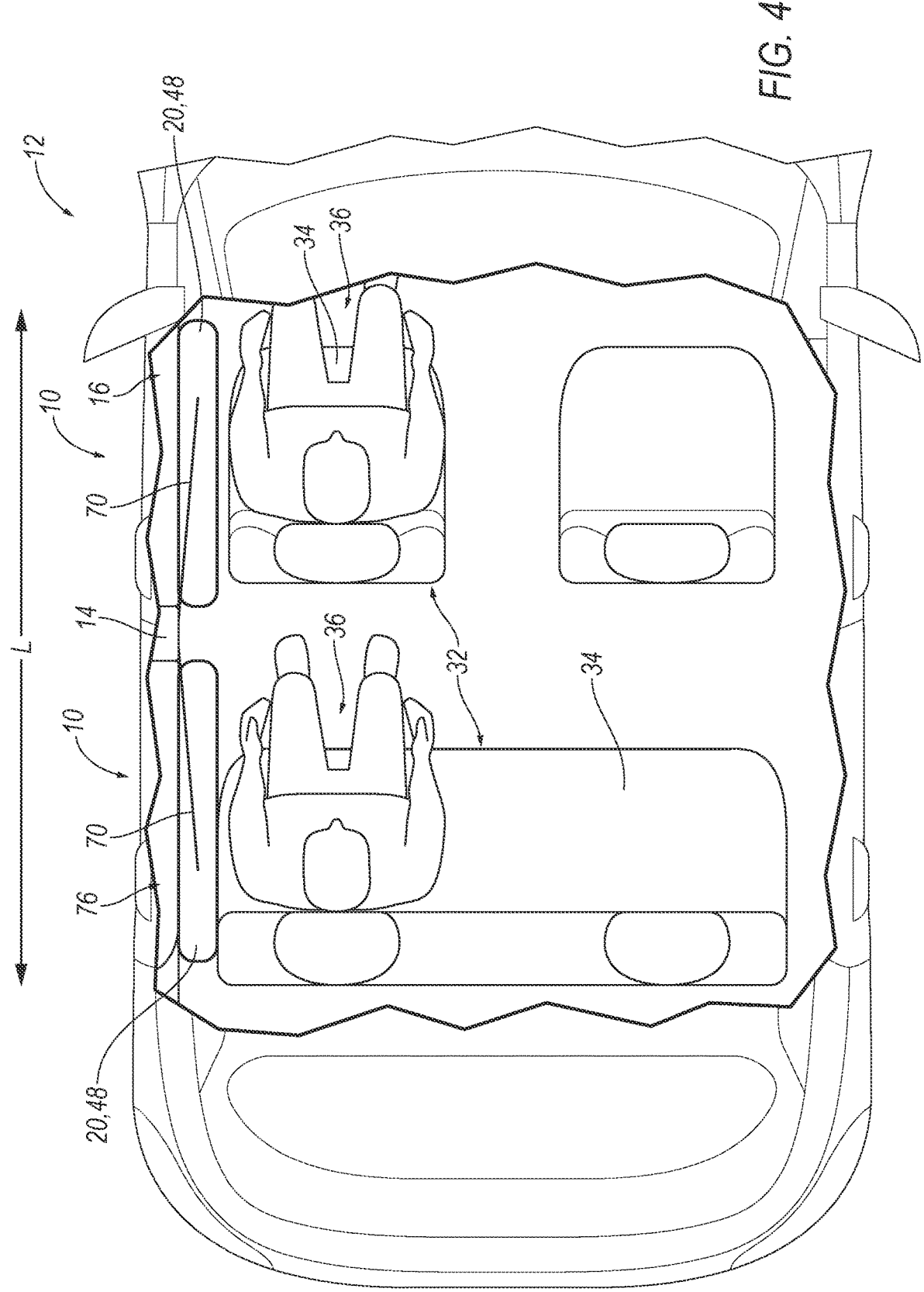
FIG. 4 is a plan view of the vehicle with the airbags in the inflated position.
Figure 5:
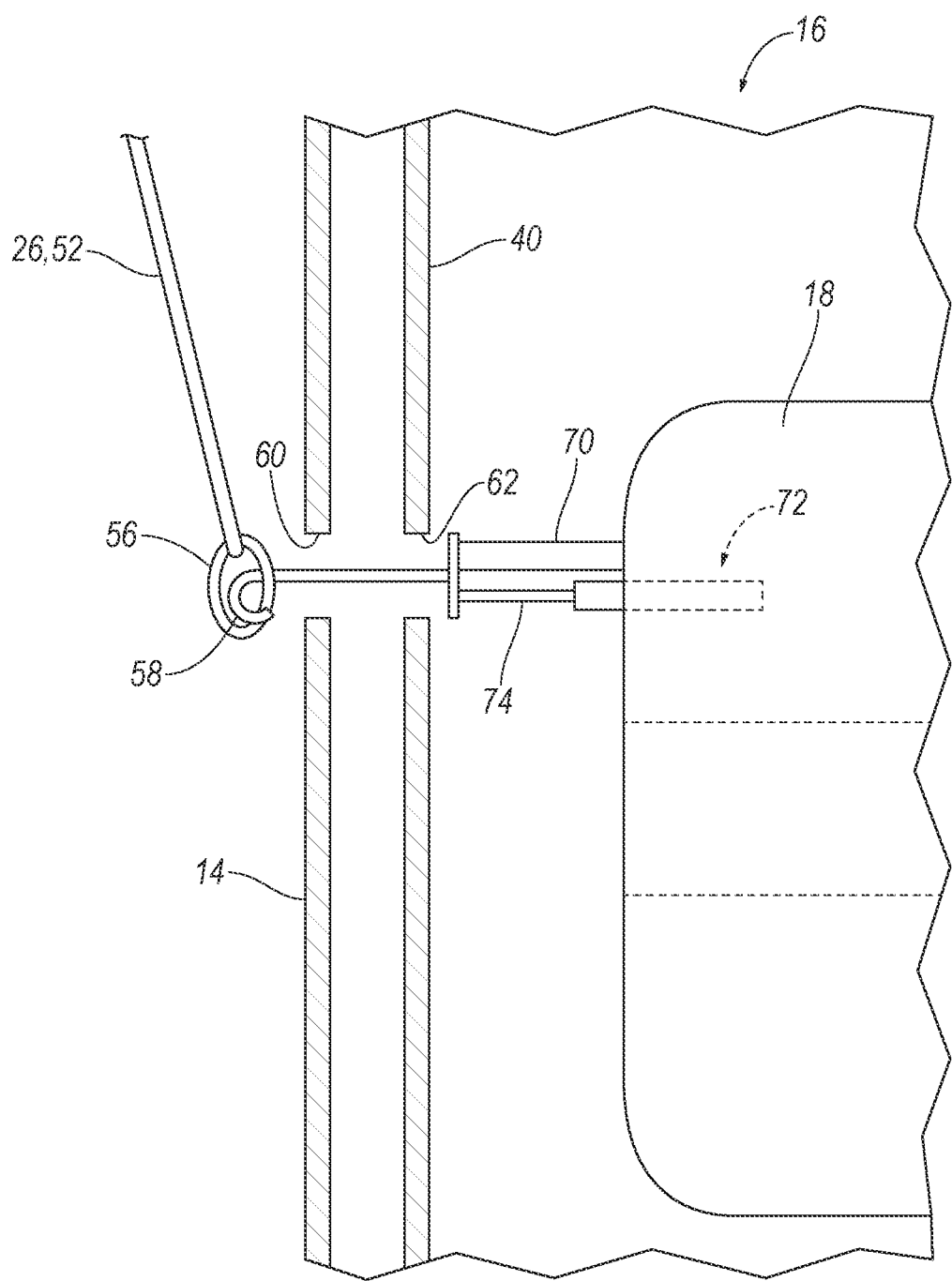
FIG. 5 is a partial cross-sectional view through line 5 of FIG. 1 when the front door is in a closed position.
Figure 6:
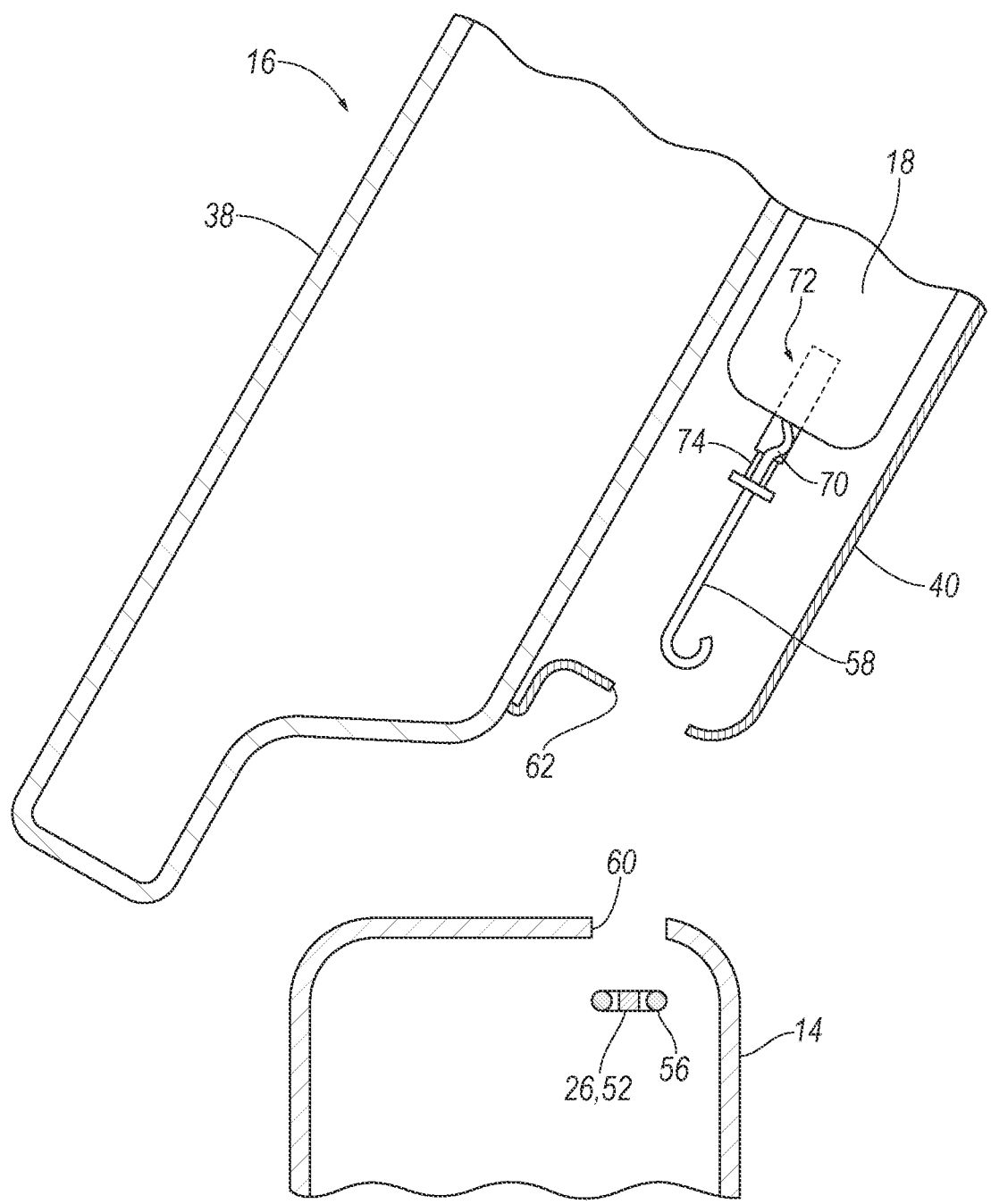
FIG. 6 is a partial cross-sectional view through line 6 of FIG. 1 when the front door is in the open position.
Figure 7:
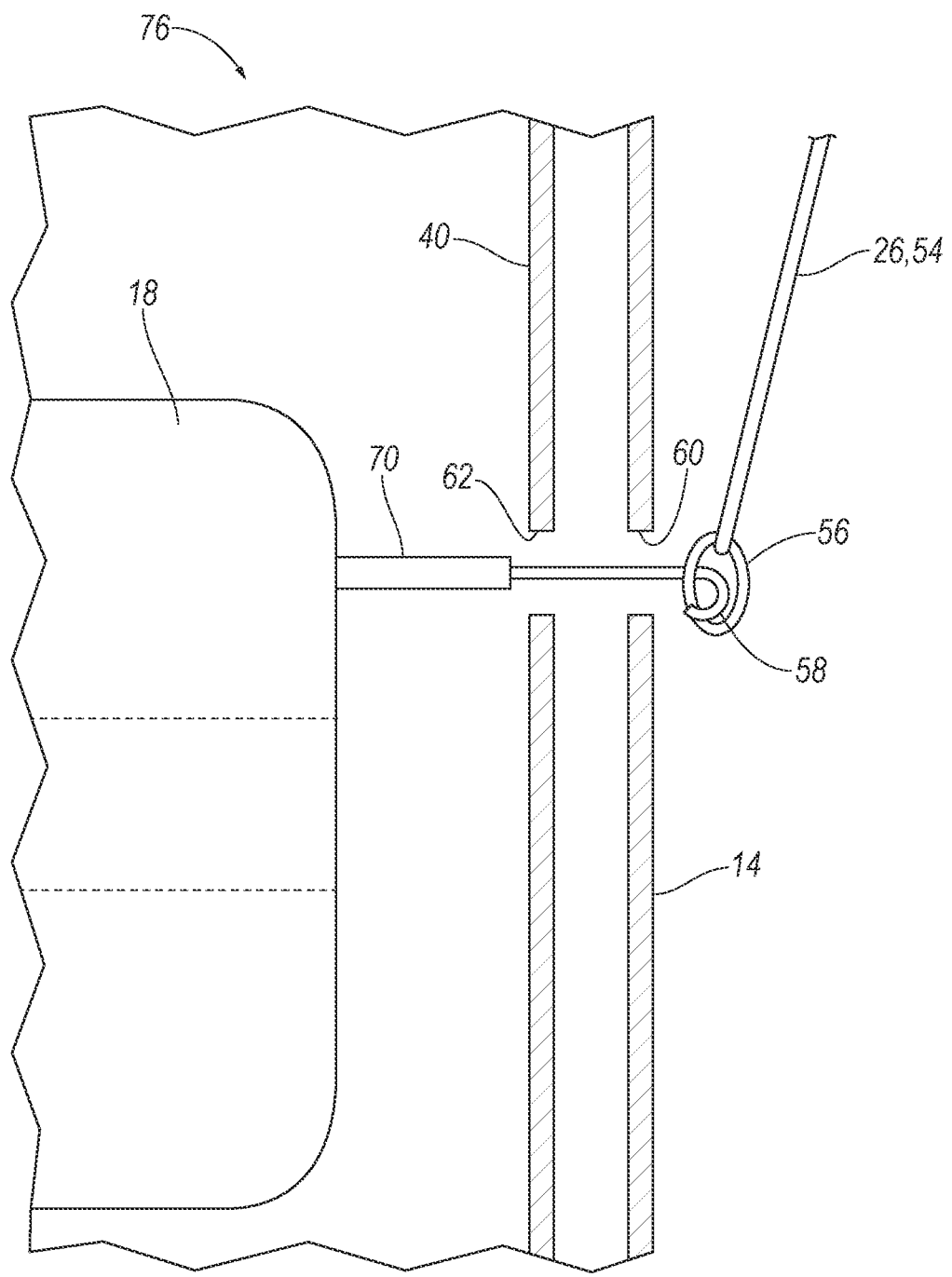
FIG. 7 is a partial cross-sectional view through line 7 of FIG. 1 when the rear door is in the closed position.
Figure 8:
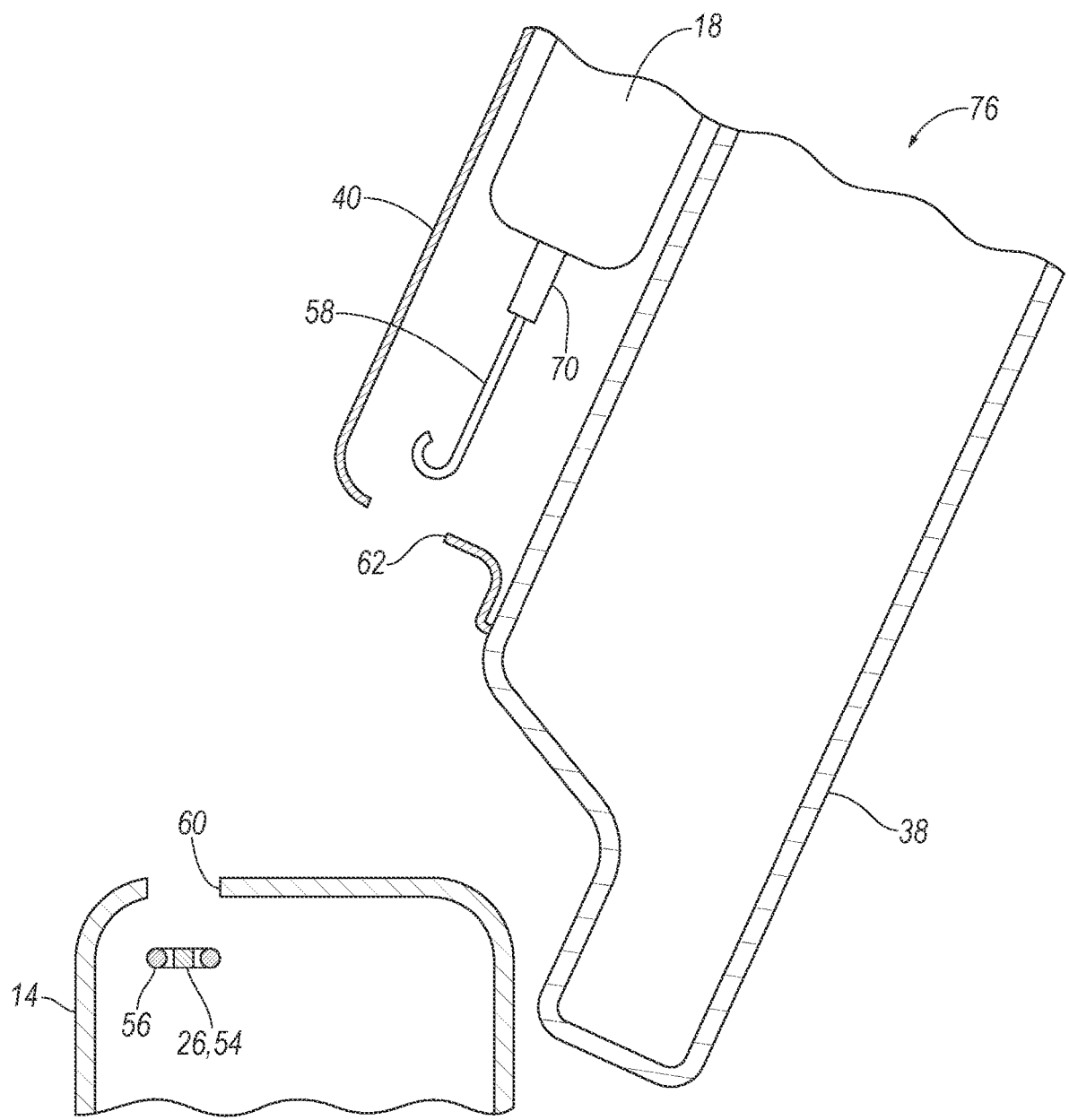
FIG. 8 is a partial cross-sectional view through line 8 of FIG. 1 when the rear door is in the open position.

With reference to FIG. 4, the vehicle 12 may include one or more seats 32. Specifically, the vehicle 12 may include any suitable number of seats 32. As shown in FIG. 1, the seats 32 are supported by the vehicle 12 floor 30 (not numbered). The seats 32 may be arranged in any suitable arrangement in the passenger compartment. As in the example shown in the Figures, one or more of the seats 32 may be at the front end of the passenger compartment, e.g., a driver seat 32 and/or a passenger seat 32. In other examples, one or more of the seats 32 may be behind the front end of the passenger compartment, e.g., at the rear end of the passenger compartment. The seats 32 may be movable relative to the vehicle 12 floor 30 to various positions, e.g., movable fore-and-aft and/or cross-vehicle 12. The seat 32 may be of any suitable type, e.g., a bucket seat.

The seat 32 includes the seatback (not numbered) and a seat bottom 34 (not numbered). The seatback may be supported by the seat bottom 34 and may be stationary or movable relative to the seat bottom 34. The seatback and the seat bottom 34 may be adjustable in multiple degrees of freedom. Specifically, the seatback and the seat bottom 34 may themselves be adjustable. In other words, adjustable components within the seatback and/or the seat bottom 34, and/or may be adjustable relative to each other.

The seat 32, specifically the seatback and the seat bottom 34, defines an occupant seating area 36. The occupant seating area 36 is the area occupied by an occupant when properly seated on the seat bottom 34 and the seat 32 back. The occupant seating area 36 is in a seat-forward direction of the seatback and above the seat bottom 34. In the example shown in the Figures, the occupant seating area 36 faces the front end of the passenger compartment.

With continued reference to FIGS. 1-6, the vehicle 12 includes a plurality of doors 16, 76 openable for vehicle 12 occupants to enter and exit a passenger compartment. The doors 16, 76 may be openable between a closed position and an open position. On each side of the vehicle 12, the vehicle 12 includes a front door 16 spaced along a vehicle-longitudinal axis L from a rear door 76. Each of the doors 16, 76 are adjacent a seat 32 in the vehicle 12. Each of the front seats 32 and each of the rear seats 32 may be adjacent a door 16, 76 of the vehicle 12. Specifically, each front seat 32 may be adjacent a front door 16 and each rear seat 32 may be adjacent a rear door 76. The doors 16, 76 are vehicle-outboard from each of the front seats 32 and each of the rear seats 32. The vehicle 12 includes pillars 14 adjacent the doors 16, 76. The vehicle 12 includes a pillar 14 in front of the front door 16, e.g., an A-pillar. The vehicle 12 includes a pillar 14 between the front door 16 and the rear door 76 on each side of the vehicle 12, e.g., a B-pillar.

Roof rails (not numbered) of the vehicle 12 contact a top edge of the doors 16, 76 when the doors 16, 76 are in the closed position. Each door 16, 76 includes at least one door panel 38 and a door-trim panel 40 supported on the door panel 38. The door-trim panel 40 is vehicle-inboard of the door panel 38. The door 16, 76 includes a window opening (not numbered) that may be completely closed by a window 42 when the window 42 is in a fully raised position. The window opening may be defined by the door-trim panel 40 and the door panel 38 on a bottom edge and either the door panel 38 or the vehicle body may circumscribe the window opening.

The door 16, 76, e.g., the door panel 38, may define a portion of the exterior of the vehicle 12. For example, the door 16, 76 may present a class-A surface along the exterior of the vehicle 12, i.e., a surface specifically manufactured to have a high-quality, finished aesthetic appearance free of blemishes. The door panel 38 may be metal (such as steel, aluminum, etc.) or polymeric (such as fiber reinforced plastic composite, etc.). The door 16, 76 may provide a mounting location for other components of the vehicle 12, e.g., switches, lights, etc. The door-trim panel 40 may be a material suitable for an interior of the vehicle 12, such as vinyl, plastic, leather, wood, etc.

With continued reference to FIGS. 1-6, the vehicle 12 includes one or more airbag assemblies 44. The airbag assembly 44 may include a housing (not shown), an inflator 46, and the airbag 18. The inflator 46 is in fluid communication with the airbag 18. The inflator 46 expands the airbag 18 with inflation medium, such as a gas, to move the airbag 18 from an uninflated position to an inflated position. The inflator 46 may be supported by any suitable component. For example, the inflator 46 may be supported by the door panel 38. The inflator 46 may be, for example, a pyrotechnic inflator that ignites a chemical reaction to generate the inflation medium, a stored gas inflator that releases e.g., by a pyrotechnic valve stored gas as the inflation medium, or a hybrid. The inflator 46 may be, for example, at least partially in the inflation chamber to deliver inflation medium directly to the inflation chamber or may be connected to the inflation chamber through fill tubes, diffusers, etc.

The vehicle 12 may include any suitable number of airbag assemblies 44. The airbag assemblies 44, specifically, the airbag 18, are supported by one or more of the doors 16, 76. The airbag assembly 44 is supported by one or more of the doors 16, 76 adjacent one or more of the seats 32. An airbag assembly 44 may be supported by the front door 16 of the vehicle 12 and an airbag assembly 44 may be supported by the rear door 76 of the vehicle 12. In other words, the vehicle 12 may include a first airbag 18 supported by the front door 16 and a second airbag 18 supported by the rear door 76. One of the pillars 14, e.g., the B-pillar, is between the first airbag 18 and the second airbag 18.

The airbag assemblies 44, specifically, the airbags 18, may be supported by the door 16, 76 between the door-trim panels 40 and the door panels 38 when the airbag 18 in the uninflated position. Specifically, the airbags 18 may be mounted to the door 16, 76 between the door-trim panel 40 and the door panel 38, e.g., by fasteners or in any other suitable way. In the uninflated position, the airbag assemblies 44, e.g., the airbags 18, are concealed behind the door-trim panel 40. In the event of an impact to the vehicle 12, e.g., a side impact to the vehicle 12, the airbags 18 may move toward the inflated position. The door-trim panel 40 may include a tear seam or any suitable feature to allow the airbags 18 to penetrate through the door-trim panel 40 to move to the inflated position.

In the inflated position, the airbags 18 are vehicle-inboard of the doors 16, 76 when the airbag 18 is in the inflated position. The airbags 18 are inflatable between the doors 16, 76 and the seats 32 of the vehicle 12. Specifically, the airbags 18 are inflatable between the doors 16, 76 and the occupant seating areas 36 in the inflated position to control the kinematics of an occupant adjacent the airbags 18 in the event of an impact to the vehicle 12, e.g., a side impact to the vehicle 12.

The airbags 18 supported by each of the doors 16, 76 of the vehicle 12 include the upper portion 20 and the lower portion 22 opposite the upper portion 20. Specifically, the upper portion 20 is inflatable upwardly and the lower portion 22 is inflatable downwardly as the airbag 18 moves toward the inflated position. The upper portion 20 is inflatable toward the roof 28 of the vehicle 12 and the lower portion 22 is inflatable toward the floor 30 of the vehicle 12. The upper portion 20 may be inflatable adjacent the window 42 of the door 16, 76. The upper portion 20, in examples where the window 42 is in the fully raised position, may use the window 42 as a reaction surface. In other words, the window 42 may support the upper portion 20 of the airbag 18 as the airbag 18 controls the kinematics of the occupant of the seat 32. The lower portion 22 may be inflatable adjacent the door-trim panel 40. The lower portion 22 may use the door-trim panel 40 as a reaction surface. In other words, the door-trim panel 40 may support the upper portion 20 of the airbag 18 as the airbag 18 controls the kinematics of the occupant of the seat 32. The lower portion 22 may be between the occupant seating area 36 and the door-trim panel 40 when the airbag 18 is in the inflated position.

The upper portion 20 of the airbag 18 includes an upper end 48 that moves upwardly toward the roof 28 of the vehicle 12 as the airbag 18 moves toward the inflated position. The lower portion 22 includes a lower end 50 that is spaced downwardly from the upper end 48 in the inflated position. The lower portion 22 moves downwardly toward the floor 30 as the airbag 18 moves toward the inflated position.

Figure 2:
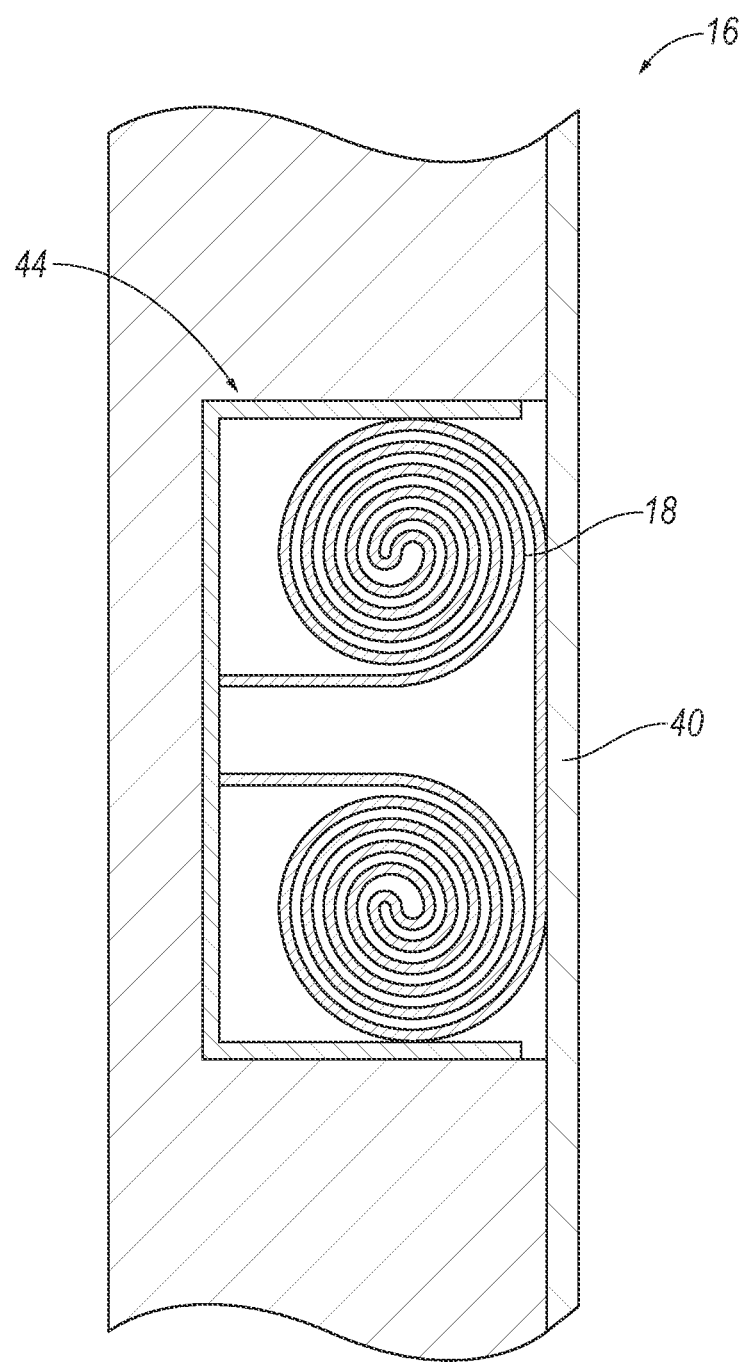
FIG. 2 is a cross-sectional view through the airbag wherein the airbag is doubly rolled.

As shown in FIG. 2, in the uninflatable position, the upper portion 20 of the airbag 18 and the lower portion 22 of the airbag 18 are doubly rolled. In other words, when the airbag 18 is in the uninflated position, the upper portion 20 of the airbag 18 may be rolled between the door-trim panel 40 and the door panel 38 and the lower portion 22 of the airbag 18 may be rolled between the door-trim panel 40 and the door panel 38.

The upper portion 20 and the lower portion 22 are in fluid communication with each other when the airbag 18 is in the inflated position. In other words, the inflator 46 moves inflation medium into the upper portion 20 and the lower portion 22 and the inflation medium may move freely between the upper portion 20 and the lower portion 22.

The airbag 18, e.g., the inflation chamber, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 3:
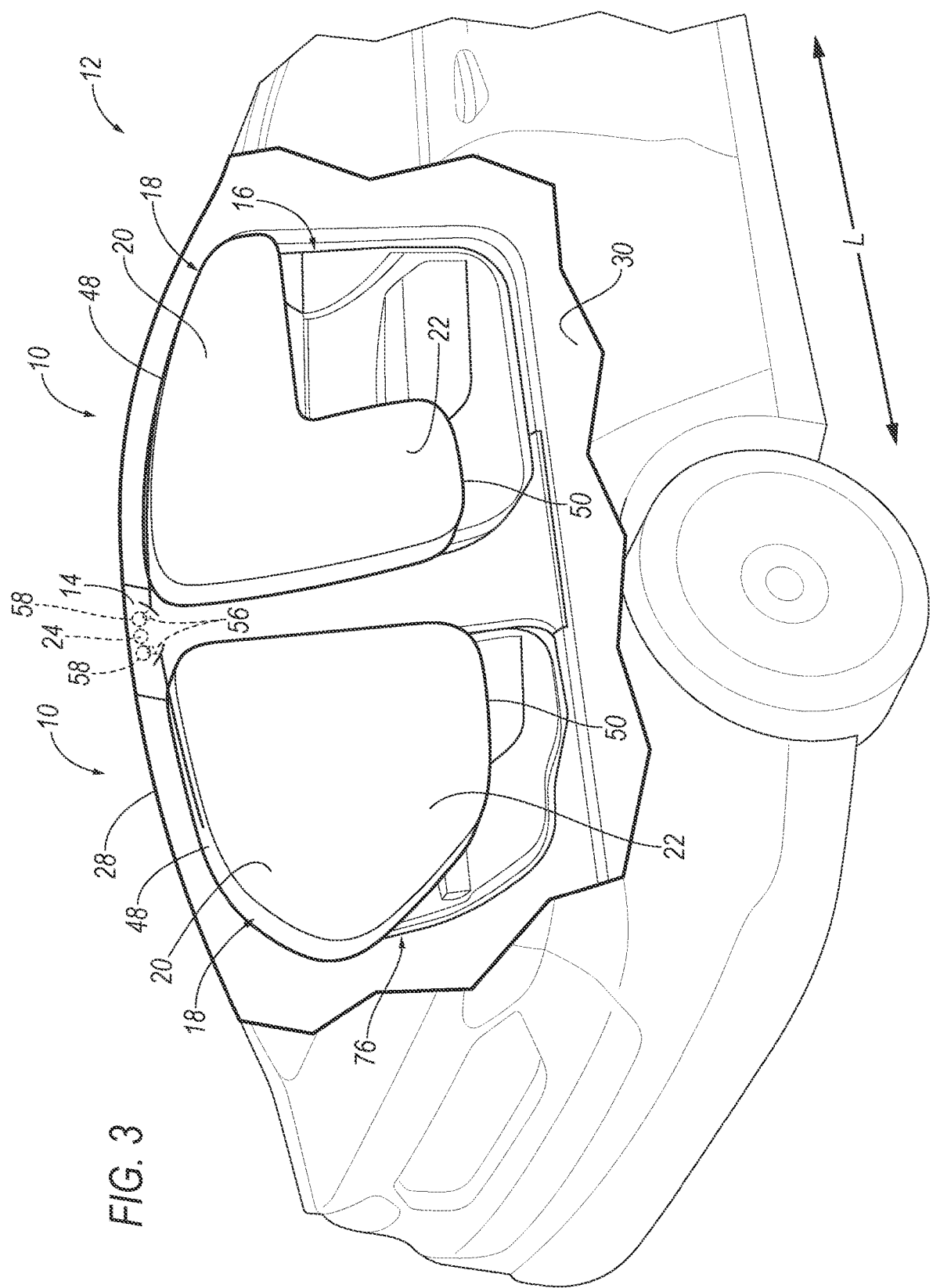
FIG. 3 is a side cutaway view of the vehicle with the airbags in the inflated position.

With reference to FIGS. 1 and 3, the assembly 10 includes the pyrotechnic device 24 supported by the pillar 14 that is between the front door 16 and the rear door 76, e.g., the B-pillar. The pyrotechnic device 24 may be mounted to the pillar 14 in any suitable way, e.g., fasteners, etc. The pyrotechnic device 24 may be coupled to the upper portion 20 of the airbag 18 to move the upper portion 20 toward the roof 28 the vehicle 12. Specifically, the pyrotechnic device 24 may be coupled to the upper end 48 of the upper portion 20 of the airbag 18 to move the upper end 48 toward the roof 28. In the event of an impact, the airbag 18 may begin to inflate and the pyrotechnic device 24 may be activated. When the pyrotechnic device 24 is activated, the pyrotechnic device 24 may move the upper portion 20 toward the roof 28 and secure the upper portion 20 upwardly to limit downward movement of the upper portion 20 of the airbag 18. The pyrotechnic device 24 may be, as shown in the Figures, positioned at a top of the pillar 14, e.g., adjacent the roof 28 of the vehicle 12.

The pyrotechnic device 24 may include a pyrotechnic charge that activates the pyrotechnic device 24 to move the upper end 48 of the upper portion 20 toward the roof 28 of the vehicle 12. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic device 24 may be any suitable type such as a rotary pyrotechnic device, in which the pyrotechnic charge rotates a shaft connected to the cable 26 such that the cable 26 wraps around the shaft; a piston linkage, in which the pyrotechnic charge for example, drives a piston attached to the cable 26; a ball-in-tube linkage, in which an pyrotechnic charge propels a ball or balls over a cogwheel connected to the cable 26; a mechanical linkage, in which a compressed spring attached to the cable 26 is released; or any other suitable type.

The cable 26 couples the upper portion 20 of the airbag 18 to the pyrotechnic device 24. Specifically, the cable 26 extends from the pyrotechnic device 24 and to couple the upper end 48 of the upper portion 20 of the pyrotechnic device 24. The cable 26 extends along the pillar 14 from the pyrotechnic device 24 and is coupled to the upper end 48 of the upper portion 20 of the airbag 18. The cable 26 may be of any suitable material such as metal, carbon fiber, etc. The cable 26 is flexible relative to the pyrotechnic device 24 to operate as described herein.

The cable 26 is movable upwardly along the pillar 14 by the pyrotechnic device 24 as the airbag 18 inflates to the inflated position. In other words, when the pyrotechnic device 24 is activated, the pyrotechnic device 24 pulls the cable 26 along the upwardly along the pillar 14. The cable 26 may run along an edge of the pillar 14 where the pillar 14 meets the door 16, 76, e.g., along an edge on the vehicle-forward side of the pillar 14 or an edge on the vehicle-rearward side of the pillar 14. As the cable 26 is pulled upwardly by the pyrotechnic device 24, the upper portion 20 of the airbag 18 is pulled toward the roof 28 of the vehicle 12. The cable 26 limits the downward movement of the upper portion 20 as the airbag 18 inflates to the inflated position. The cable 26 allows the upper portion 20 to remain adjacent the window 42 of the door 16, 76 and to use the window 42 as a reaction surface in the inflated position.

In examples including an airbag 18 supported on the front door 16 and a second airbag 18 supported on the rear door 76, the cable 26 may include a first portion 52 coupling the pyrotechnic device 24 to the upper end 48 of the upper portion 20 of the airbag 18 supported by the front door 16 and a second portion 54 coupling the pyrotechnic device 24 to the upper end 48 of the upper portion 20 of the second airbag 18 supported by the rear door 76. When the pyrotechnic device 24 is activated and the cable 26 moves upwardly along the pillar 14, the cable 26 pulls the upper end 48 of both the airbag 18 supported by the front door 16 and the airbag 18 supported by the rear door 76 to move the upper ends 48 toward the roof 28 of the vehicle 12. The first portion 52 and the second portion 54 of the cable 26 to limit the downward movement of the upper portions 20 of the airbags 18 when the airbags 18 are in the inflated position. The first portion 52 and the second portion 54 of the cable 26 allows the upper portion 20 to remain adjacent the window 42 of the door 16, 76 and to use the window 42 as a reaction surface in the inflated position.

The assembly 10 may include a hook 56 connected to one of the upper portion 20 of the airbag 18 and the cable 26 and a ring 58 connected to the other of the upper portion 20 of the airbag 18 and the cable 26. In other words, in some examples, such as shown in the figures, the hook 56 is connected to the upper portion 20 of the airbag 18 and the ring 58 is connected to the cable 26. In other examples, the hook 56 is connected to the cable 26 and the ring 58 is connected to the upper portion 20 of the airbag 18. The hook 56 may be connected to the upper portion 20 of the airbag 18 by a tether 70. In other words, a tether 70 may extend from the upper portion 20 of the airbag 18 to the hook 56.

The hook 56 may be moveable into and out of the ring 58 depending on whether the door 16, 76 is in the open position or the closed position. Specifically, the hook 56 may be in the ring 58 when the doors 16, 76 are in the closed position and the hook 56 may be out of the ring 58 when the doors 16, 76 are in the open position. In other words, the hook 56 may be engageable with the ring 58 when the doors 16, 76 are in the closed position and no longer engageable with the ring 58 when the doors 16, 76 are in the open position. The pillar 14 may include a first hole 60 and the door 16, 76 may include a second hole 62 that is concentric with the first hole 60. The hook 56 may extend from tether 70 and through the first hole 60 and the second hole 62 and into the pillar 14. The ring 58 may be aligned with the holes 60, 62 as shown in FIGS. 5, 6, 7, and 8 to receive the hook 56 when the doors 16, 76 are in the closed position. When the pyrotechnic device 24 is activated, the cable 26 moves upwardly along the pillar 14 and the ring 58 engages the hook 56. The ring 58 carries the hook 56 and the upper end 48 of the upper portion 20 upwardly as the cable 26 is moved upwardly by the pyrotechnic device 24.

The hook 56 is engageable with the ring 58 when the airbag 18 is in the inflated position. In other words, the hook 56 hooks to the ring 58 when the hook 56 is in the ring 58. When the hook 56 is engaged with the ring 58, the hook 56 is drawn along the pillar 14 as the ring 58 is drawn along the pillar 14.

In examples such as shown in the Figures, where the vehicle 12 includes an airbag 18 supported by the front door 16 and a second airbag 18 supported by the rear door 76. The airbag 18 supported by the front door 16 and the second airbag 18 supported by the rear door 76 each have a hook 56 connected to the upper end 48 of the upper portions 20. The assembly 10 includes a ring 58 connected to both the first portion 52 and the second portion 54 of the cable 26, i.e., two rings 58 are connected to the cable 26, one for each airbag 18. Both rings 58 move upwardly along the pillar 14 as the airbags 18 inflate to the inflated position and the upper ends 48 are pulled toward the ceiling as the airbags 18 move to the inflated position.

In some examples, the assembly may include a solenoid 72. For example, as shown in FIGS. 5-8, the front door 16 may include the solenoid 72 and the rear door 76 may not include the solenoid 72. In other examples, both the front door 16 and the rear door 76 may include the solenoid 72. In further examples, both the front door 16 and the rear door 76 may not include the solenoid 72. In examples including the solenoid 72, the solenoid 72 may be supported by any suitable component of the assembly 10, e.g., the solenoid 72 may be supported by the door panel 38, the solenoid 72 may be supported by the door-trim panel 40, the solenoid may be supported by the airbag 18, etc. The solenoid 72 may be coupled to the hook 56 and the hook 56 may be moveable by the solenoid 72 along the vehicle-longitudinal axis L. Specifically, the solenoid 72 may have a piston 74 coupled to the hook 56 to move the hook 56. The piston 74 is movable along the vehicle longitudinal axis L to move the hook 56 into and out of the holes 60, 62.

In some examples, the solenoid 72 moves the hook 56 into the ring 58 after the door 16, 76 moves to the closed position. The piston 74 of the solenoid pushes the hook 56 through the holes 60, 62 and into the ring 58 when the door is in the closed position. The piston 74 of the solenoid 72 is retracted to retract the hook 56 when the door 16, 76 moves to the open position, e.g., when an occupant of the vehicle 12 pulls a door handle (not numbered) to move the door 16, 76 to the open position.

In other examples, the solenoid 72 may move the hook 56 into the ring 58 upon identification of an impact to the vehicle 12. In such examples, the hook 56 may remain retracted by the solenoid 72 until an impact is identified. When an impact is identified, the solenoid 72 may become activated and the piston 74 may move the hook 56 into the ring 58.

Figure 9:
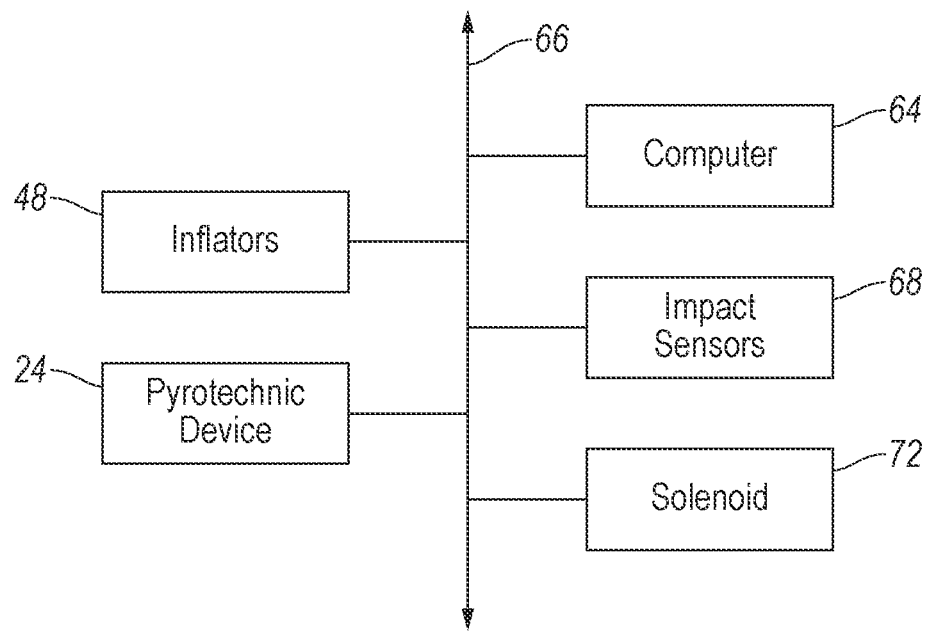
FIG. 9 is a block diagram of a vehicle communication network of the vehicle.

With reference to FIG. 9, the vehicle 12 includes a computer 64 including a processor and a memory. The computer 64 may be a restraints control module. The memory includes one or more forms of computer readable media, and stores instructions executable by the vehicle computer 64 for performing various operations, including as disclosed herein and including, for example, method 800 shown in FIG. 8 and described below. For example, a vehicle computer 64 can be a generic computer 64 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a vehicle computer 64 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data sent from the sensors. The memory can be a separate device from the computer 64, and the computer 64 can retrieve information stored by the memory via a network in the vehicle 12, e.g., over a CAN bus, a wireless network, etc. Alternatively or additionally, the memory can be part of the computer 64, e.g., as a memory of the computer 64.

The computer 64 is generally arranged for communications on a vehicle communication network 66 that can include a bus in the vehicle 12 such as a controller area network CAN or the like, and/or other wired and/or wireless mechanisms. Alternatively or additionally, in cases where the computer 64 actually comprises a plurality of devices, the vehicle communication network 66 may be used for communications between devices represented as the computer 64 in this disclosure. Further, as mentioned below, various controllers and/or sensors may provide data to the computer 64 via the vehicle communication network 66.

The vehicle 12 may include at least one impact sensor 68 for sensing impact of the vehicle 12, and a computer 64 in communication with the impact sensor 68 and the inflators 46. The computer 64 may activate the inflators 46, e.g., provide an impulse to a pyrotechnic charge of the inflators 46 when the impact sensor 68 senses an impact of the vehicle 12. Alternatively or additionally to sensing impact, the impact sensor 68 may be configured to sense impact prior to impact, i.e., pre impact sensing. The impact sensor 68 may be in communication with the computer 64. The impact sensor 68 is configured to detect an impact to the vehicle 12. The impact sensor 68 may be of any suitable type, for example, post contact sensors such as accelerometers, pressure sensors, and contact switches; and pre impact sensors 68 such as radar, LIDAR, and vision sensing systems. The vision sensing systems may include one or more cameras, CCD image sensors, CMOS image sensors, etc. The impact sensor 68 may be located at numerous points in or on the vehicle 12.

The adjectives first and second are used throughout this document merely as identifiers and do not indicate importance, order, or quantity.

Figure 10:
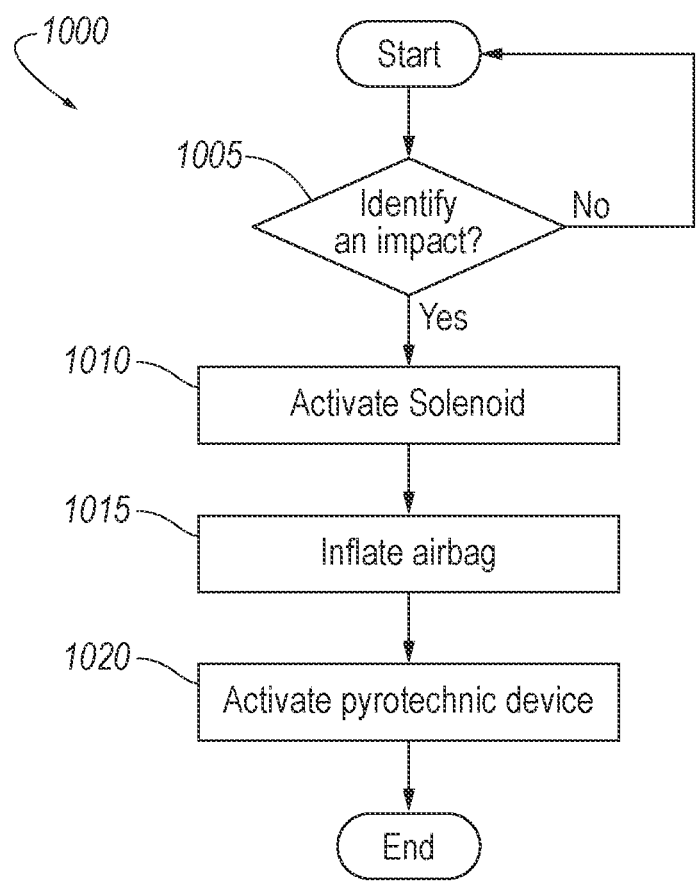
FIG. 10 is a flowchart of a method executable by a computer of the vehicle.

With reference to FIG. 10, the computer 64 stores instructions to control components of the vehicle 12 according to the method 1000. Specifically, as shown in FIG. 10, the pyrotechnic device 24 may pull the upper portion 20 of the airbag 18 upwardly as the airbag 18 moves to the inflated position. Use of "in response to," "based on," and "upon determining" herein, including with reference to method 800, indicates a causal relationship, not merely a temporal relationship.

With reference to decision block 1005, the method 1000 includes identifying an impact to the vehicle 12. The impact sensors 68 may sense an impact to the vehicle 12 and identify the impact. One or more of the impact sensors 68 may send a signal to the computer 64 identifying the impact to the vehicle 12. If no impact is identified to the vehicle 12, the method 800 returns to its start.

With reference to block 1010, in examples including the solenoid 72 and where the solenoid 72 remains retracted until the identification of an impact, the method 1000 includes the solenoid 72 being activated in response to identifying the impact to the vehicle 12. The computer 64 may send a signal to the solenoid 72 to activate and move the piston 74 to move the hook 56 thought the holes 60, 62 and into the ring 58.

With reference to block 1015, the method 1000 includes to inflating the airbag 18 to the inflated position. The computer 64 may send a signal to the inflator 46 to indicate that an impact has been identified and to inflate the airbag 18 to the inflated position. The inflator 46 is activated to pass inflation medium into the airbag 18 to inflate the airbag 18 to the inflated position.

With reference to block 1020, in response to inflating the airbag 18, the method 1000 includes activating the pyrotechnic device 24. When the pyrotechnic device 24 is activated, the cable 26 is moved by the pyrotechnic device 24 upwardly along the pillar 14 to pull the upper portion 20 of the airbag 18 upwardly toward the roof 28 of the vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle pillar;
   a vehicle door adjacent the vehicle pillar;
   an airbag supported by the vehicle door;
   the airbag including an upper portion inflatable upwardly and a lower portion inflatable downwardly;
   a pyrotechnic device supported by the vehicle pillar; and
   a cable extending along the vehicle pillar from the pyrotechnic device and coupling the upper portion of the airbag to the pyrotechnic device.

2. The assembly of claim 1, wherein the upper portion of the airbag includes an upper end, the cable coupling the upper end of the upper portion of the airbag to the pyrotechnic device.

3. The assembly of claim 1, further comprising a hook connected to one of the upper portion of the airbag and the cable and a ring connected to the other of the upper portion of the airbag and the cable, the hook and the ring being engaged when the airbag inflates to an inflated position.

4. The assembly of claim 3, further comprising a solenoid coupled to the hook, the hook being moveable by the solenoid along a vehicle-longitudinal axis.

5. The assembly of claim 1,
   wherein the vehicle door moves relative to the vehicle pillar between an open position and a closed position;
   further comprising a hook connected to one of the upper portion of the airbag and the cable and a ring connected to the other of the upper portion of the airbag and the cable; and the hook being in the ring when the vehicle door is in the closed position.

6. The assembly of claim 5, wherein the hook is out of the ring when the vehicle door is in the open position.

7. The assembly of claim 1, wherein the cable is movable upwardly along the vehicle pillar by the pyrotechnic device as the airbag inflates to an inflated position.

8. The assembly of claim 1, wherein the upper portion of the airbag includes an upper end and the lower portion of the airbag includes a lower end, the upper end being spaced from the lower end.

9. The assembly of claim 1, wherein the airbag is vehicle-inboard of the vehicle door when the airbag is in an inflated position.

10. The assembly of claim 1, further comprising a vehicle seat adjacent the vehicle door, the airbag being inflatable between the vehicle seat and the vehicle door.

11. The assembly of claim 10, wherein the vehicle seat defines an occupant seating area, the airbag being inflatable between the vehicle door and the occupant seating area.

12. The assembly of claim 1, further comprising a door-trim panel supported by the vehicle door and a window supported by the vehicle door, the upper portion is inflatable adjacent the window and the lower portion of the airbag is inflatable adjacent the door-trim panel.

13. The assembly of claim 12, wherein the airbag is between the door-trim panel and the vehicle door when the airbag is in an uninflated position.

14. The assembly of claim 1, wherein the upper portion of the airbag and the lower portion of the airbag are doubly rolled in an uninflated position.

15. The assembly of claim 1, wherein the pyrotechnic device is a rotary pyrotechnic device.

16. The assembly of claim 1, further comprising:
a second vehicle door spaced from the vehicle door along a vehicle-longitudinal axis, the vehicle pillar being between the vehicle door and the second vehicle door;
a second airbag supported by the second vehicle door; and
the second airbag including an upper portion inflatable upwardly and a lower portion inflatable downwardly.

17. The assembly of claim 16, wherein the cable extends along the vehicle pillar from the pyrotechnic device and coupling the upper portion of the second airbag to the pyrotechnic device.

18. The assembly of claim 16, further comprising:
a first hook connected to one of the upper portion of the airbag and the cable and a first ring connected to the other of the upper portion of the airbag and the cable, the first hook and the first ring engaging when the airbag inflates to an inflated position; and
a second hook connected to one of the upper portion of the second airbag and the cable and a second ring connected to the other of the upper portion of the second airbag and the cable, the second hook and the second ring engaging when the second airbag inflates to an inflated position.

19. The assembly of claim 18, wherein the first ring and the second ring are movable upwardly along the vehicle pillar by the pyrotechnic device as the airbags inflate to the inflated positions.

20. The assembly of claim 16, wherein the vehicle pillar is between the airbag and the second airbag.

* * * * *